T. KEYS.
Coffee-Pot.
No. 216,861. Patented June 24, 1879.
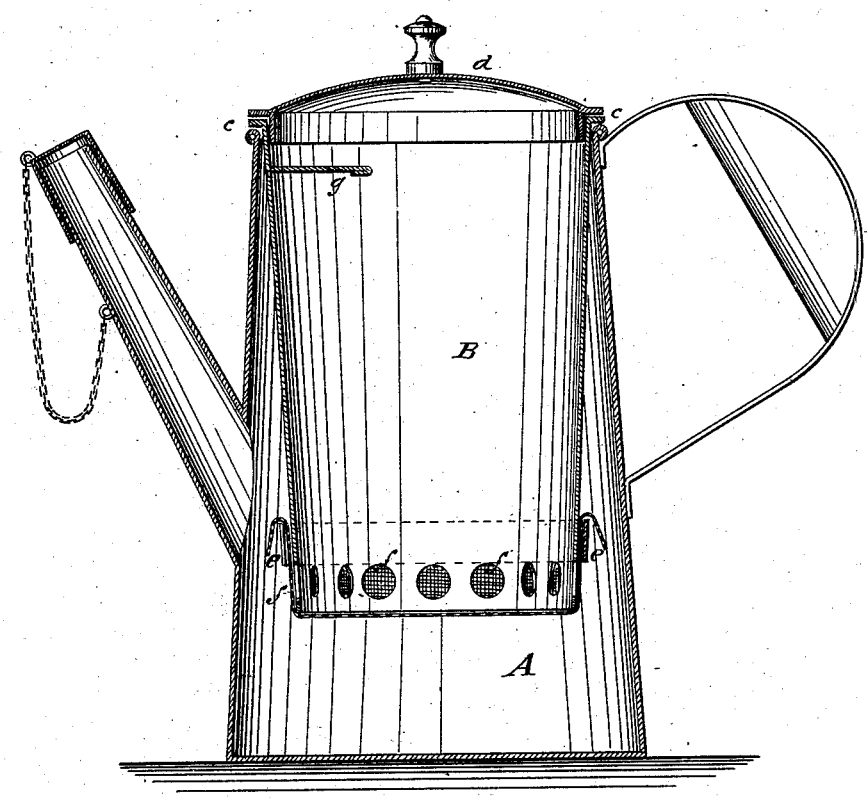
WITNESSES:
INVENTOR:
T. Keys
BY
ATTORNEYS.

UNITED STATES PATENT OFFICE.

THOMAS KEYS, OF JACKSONVILLE, ILLINOIS.

IMPROVEMENT IN COFFEE-POTS.

Specification forming part of Letters Patent No. 216,861, dated June 24, 1879; application filed March 5, 1879.

*To all whom it may concern:*

Be it known that I, THOMAS KEYS, of Jacksonville, in the county of Morgan and State of Illinois, have invented a new and useful Improvement in Coffee-Pots, of which the following is a specification.

The object of my invention is to furnish an improvement in that class of coffee-pots which are provided with an inner receptacle or strainer, whereby the contents of the pot can be poured out without the contents of the strainer leaking out at the top.

The invention consists in providing the inner receptacle or strainer of a coffee-pot with an inwardly-projecting flange or lip near its top, as shown in the accompanying drawing, wherein the coffee-pot is shown in vertical section.

The main pot A is of the usual shape and construction, and adapted for use upon a table. Within the pot A is a metal cylinder, B, that extends from the top of A to near the bottom, leaving a space below B for the liquid to be drawn from. The cylinder B is formed with an outwardly-flanged rim, c, at its upper end, that sits over the upper rim of pot A, whereby B is sustained. The cover d sits down within B, and its edge covers the flange c.

The bottom of cylinder B is covered by a piece of cloth, which is drawn tightly over it, and is held in place by a flat ring, e, around B, that clamps the edges of the cloth tightly, and is retained in place by friction, so that the cloth may be removed in cleaning cylinder B, or for substituting a new cloth for an old one.

Around the cylinder B, near its lower edge, are apertures f, which are covered by the cloth strainer. These apertures form additional straining-surface, and ring e should be large enough to slip above these openings and not cover them.

In the upper part of B is connected an inwardly-projecting flange or lip, g, upon the side of B next to the spout of the pot A. This lip g, when coffee is poured from the pot, serves to retain the grounds within B, and prevent them running out of the top.

In making coffee with the described pot, the ground coffee will be placed in cylinder B upon the cloth strainer. The hot water is then to be poured in, and the strength of the grounds will be extracted thoroughly without boiling.

The pot is adapted for use upon the table without removing the receptacle B, and the grounds cannot escape with the coffee poured from the pot.

This construction permits all parts of the pot to be thoroughly cleansed, and by using a cloth strainer it can be renewed as often as necessary without expense, and in that respect the apparatus is preferable to metal strainers, which quickly rust and are useless as soon as ruptured.

I am aware that a coffee-pot with an inwardly-projecting flange or lip near its bottom, just below the spout, to prevent the grounds from clogging up the strainer of the spout, is old; but

What I claim, and desire to secure by Letters Patent, is—

The cylinder or strainer B, provided with an inwardly-projecting flange or lip, g, substantially as and for the purpose set forth.

THOMAS KEYS.

Witnesses:
 TERENCE BRENNAN,
 FRANK C. TAYLOR.